Figure 1:
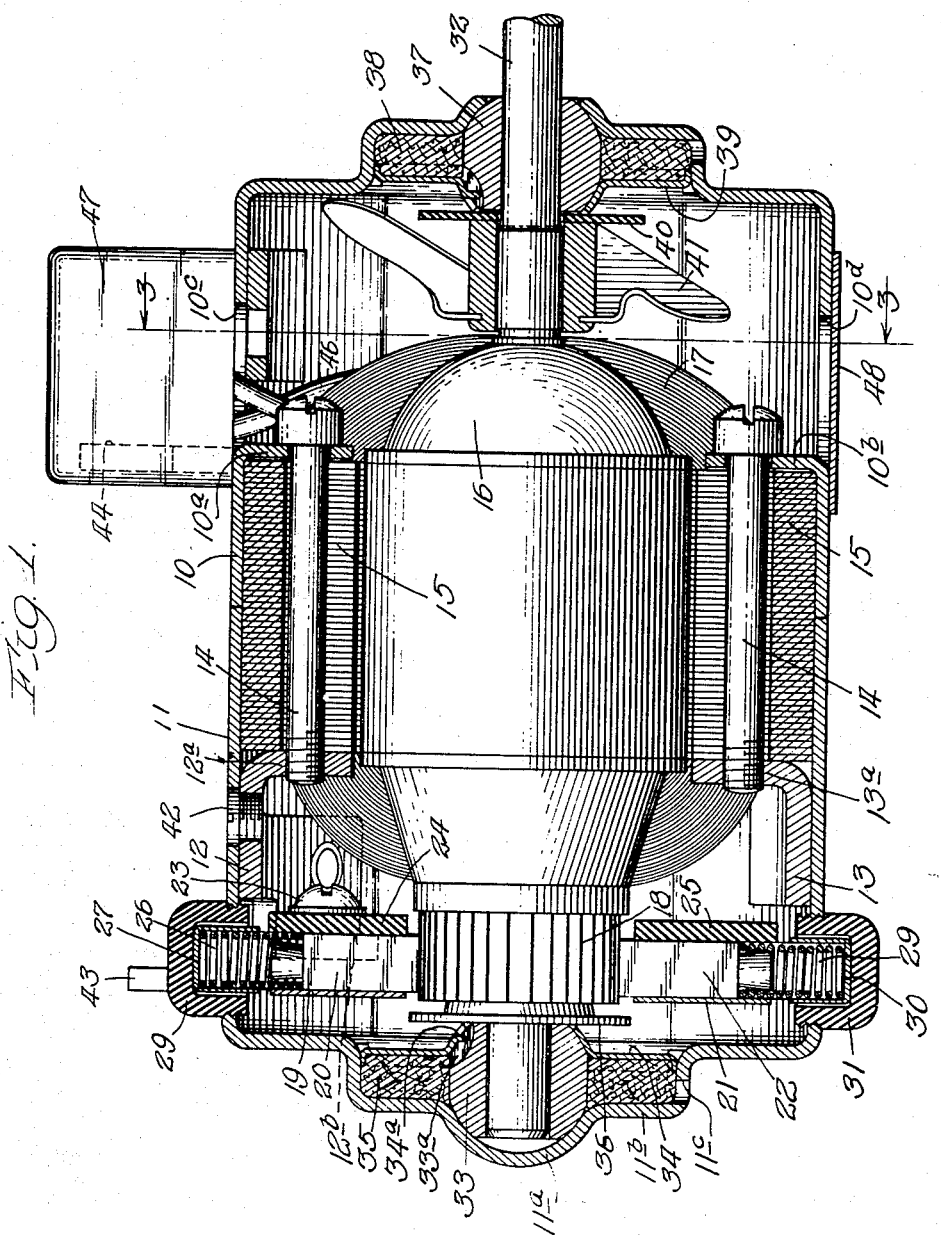

Oct. 17, 1950

J. A. SCHWARZ 2,525,836

ELECTRIC MOTOR

Filed Nov. 4, 1947

2 Sheets-Sheet 1

Inventor:
Joseph A. Schwarz,
By Christen, Schraver, Merriam & Hofgren,
Attys.

Oct. 17, 1950    J. A. SCHWARZ    2,525,836
ELECTRIC MOTOR
Filed Nov. 4, 1947    2 Sheets-Sheet 2
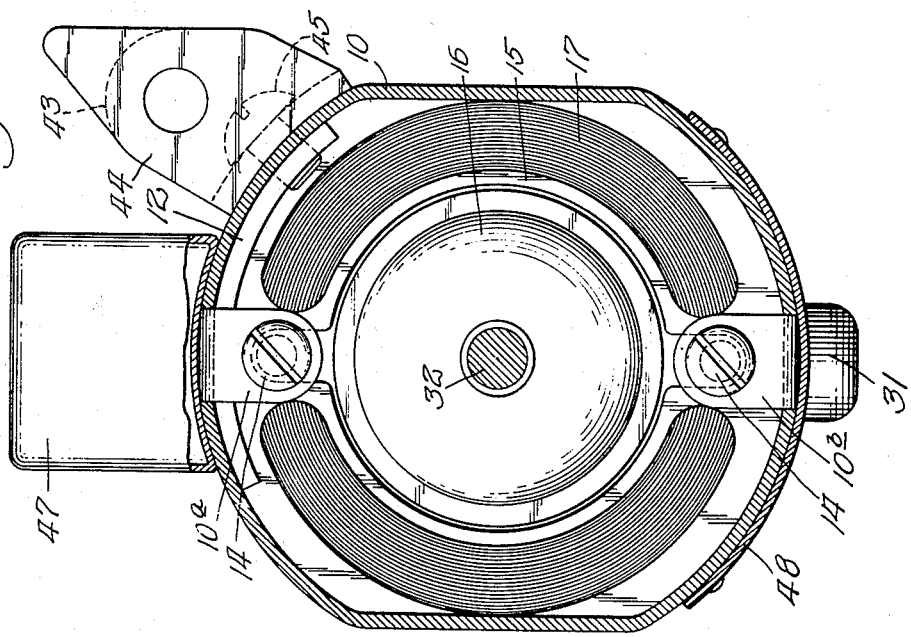
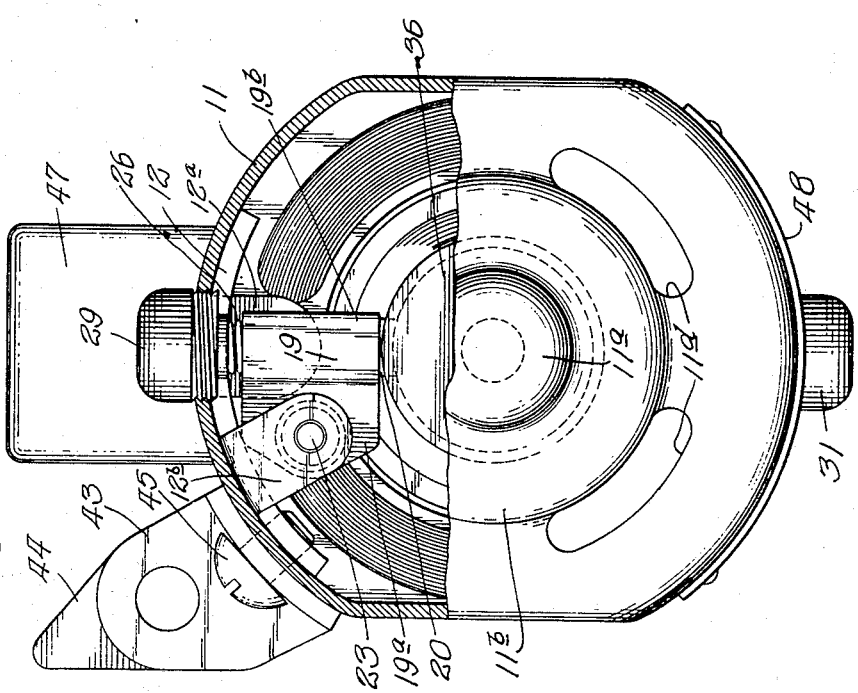
Inventor:
Joseph A. Schwarz,
By Chritton, Schroeder, Menamn & Hoffman
Attys.

Patented Oct. 17, 1950

2,525,836

UNITED STATES PATENT OFFICE 2,525,836

ELECTRIC MOTOR

Joseph A. Schwarz, Chicago, Ill., assignor to Birtman Electric Company, a corporation of Illinois Application November 4, 1947, Serial No. 783,940

6 Claims. (Cl. 172—36)

This invention relates to an electric motor, and relates particularly to a lightweight electric motor of simple construction.

The ordinary electric motor comprises an armature, field laminations, field coils, a commutator, brushes, a casing and other elements. In some cases it is very desirable to have the motor as light in weight as possible for any given horsepower rating. The ordinary motor, however, is relatively heavy and of considerable bulk because of the large number of parts needed and the fastening means used in arranging these parts in their assembled relationship. I have invented a motor that is relatively lightweight yet of strong and sturdy construction. The various parts of the motor are quite simple in construction and the means employed for holding the parts together are relatively simple, and in many cases, one part is used to perform more than one function.

The casing of the new motor is formed of a pair of members adapted to be held in abutting relationship with these members held in such relationship by means of brackets and flanges on the inner surfaces of the casing members. The flanges are preferably cut from one of the casing members, while the brackets are used not only to hold the casing members together, but also to serve as mounting members for the brush holders. The fastening means that extends between the flanges and the brackets is also preferably used to support the field laminations. With such an arrangement the motor is quite simple in construction, light in weight and is relatively inexpensive to build.

The invention will be described as related to the embodiment shown in the accompanying drawings. Of the drawings, Fig. 1 is a longitudinal vertical section through the motor; Fig. 2 is an end elevation of the motor looking from the left-hand end of Fig. 1 and with portions thereof in section; and Fig. 3 is a section taken along line 3—3 of Fig. 1.

The electric motor shown in the accompanying drawings comprises a front casing member 10 and a rear casing member 11 adapted to be held with their edges in abutting relationship. Each casing member is substantially one-half of the total casing and when in disassembled relationship are of substantially cup shape. The front casing member 10 is provided with a pair of inwardly extending flanges 10a and 10b located substantially diametrically opposite each other and extend toward each other. These flanges are cut from the casing member 10 so as to leave openings 10c and 10d.

The rear casing member 11 is provided with a pair of brackets 12 and 13 attached to the inner surfaces thereof by any means desired. The bracket 12 is provided with an inwardly extending portion 12a, while the other bracket 13 is provided with a similar portion 13a. These bracket portions 12a and 13a extend toward each other and are substantially coplanar. One bracket portion 12a is adapted to be arranged opposite a flange 10a, while the other bracket portion 13a is also adapted to be arranged opposite a flange 10b. These bracket portions and flanges will occupy this arrangement when the casing portions 10 and 11 have their open edges in abutting relationship as shown in Fig. 1. The bracket portions 12a and 13a are provided with threaded openings with each opening being adapted to retain a threaded bolt 14 extending between a flange and the bracket portion. Thus, one bolt 14 extends through a hole in the flange 10a and has its end retained in the threaded hole in the bracket portion 12a. The other bolt is similarly held so as to extend between flange 10b and bracket portion 13a. These bolts 14 serve to hold the casing portions 10 and 11 in their assembled relationship with the edges thereof abutting each other.

Arranged between the flanges 10a and 10b and the bracket portions 12a and 13a are assembled field laminations 15. These field laminations are also held in place by the bolts 14 and the laminations also serve to give greater stability to the casing members. The armature 10 of the motor is located within an opening in the field laminations 15 and is located between the edges of bracket portions 12a and 13a and flanges 10a and 10b. The field coils 17 are supported on the field laminations 15.

Each bracket 12 and 13 is provided with a second inwardly extended portion of which one 12b is shown. Each of these second bracket portions is adapted to be arranged opposite the commutator 18 of the armature 16. The second bracket portion 12b is used to rotatably support a brush holder 19 for a brush 20. The second bracket portion on the other bracket 13 is similarly arranged to hold another brush holder 21 for a second brush 22. Each brush holder, which is rotatably supported on a second bracket portion, may be locked against rotation by means of a screw 23. Each of the brush holders 19 and 21 is formed with a base portion, such as 19a, and a brush holding portion 19b having an open side. This open side is normally closed by a sheet 24 of an insulating material held in place by the screw 23. The second brush holder is similarly provided with a second sheet 25 of insulating material.

One of the brushes 20 is urged against the commutator 18 by means of a coil compression spring 26 having its upper end bearing against a cup 27 and its bottom end bearing against the outer end of the brush. The cup 27 bears against an insulating cap 28 which is also cup shaped. This cap is held in a threaded hole in the casing member 11 opposite the brush holder 19. The second brush 22 is similarly provided with a spring 29, cup 30, and cap 31.

The armature 16 is mounted on a shaft 32 having one end extending outside the motor casing. The rear end of the shaft is held in a substantially spherical bearing 33 having its back portion pressing against a spherical projection 11a at the rear of the rear casing member 11 and its front surface held by a plate 34 that is attached to the inner surface of the rear casing member 11. The area 11b of the rear casing member that is adjacent the projection 11a is spaced from the plate 34 in order to provide space for a felt oil reservoir 35. This felt may be saturated with oil through an opening 11c. The bearing 33 is prevented from rotating with the shaft 32 by an inwardly projecting flange 34a on the plate 34 which engages a depression 33a in the surface of the bearing. In order to prevent oil from the bearing from traveling to the commutator 18 there is provided a substantially circular plate 36 located between the bearing 33 and the commutator 18. This plate is arranged to rotate with the shaft.

The front end of the shaft 32 is similarly held in a bearing 37 which is also provided with a felt oil reservoir 38 and a plate 39 serving to locate the reservoir and hold the bearing 37 in place. Immediately behind the bearing 37 there is located an oil protecting plate 40 mounted on the shaft 32. Between this plate and the armature 16 there is located an air cooling fan 41 also mounted on the shaft 32. This fan serves to force air through the motor and cool the parts thereof.

Each of the brackets 12 and 13 are provided with one or more screws 42 having their shank portions held in the bracket and their head portions located in the casing member 11 with the top of the head being substantially flush with the outer surface of the casing member. These screws serve to prevent movement of the brackets relative to the casing member 11.

In the embodiment of the invention shown in the drawings there are provided a pair of spaced support brackets 43 and 44 by means of which the motor may be suspended from a base member. The rear bracket 43 is attached to the casing by means of a screw 45 that extends through a flange on the bracket, the rear casing member 11, and the internal bracket 12. The front support bracket 44 may be held in place by means of a similar screw, by welding or by any other desired means.

The opening 10c that results from the formation of the flange 10a may serve as a point of access for the motor lead wires 46. This opening may then be covered by a terminal box 47 into which the wires 46 extend and which serves as a means for connecting the motor to a source of electric power. The other opening 10b in the casing 10 may be covered by a name plate 48 or the like. In order to provide cooling air to the motor, the casing members may be provided with openings or slots in the ends thereof. The slots in the rear casing member 11 are shown in Fig. 2 and are in the form of arcuate slots 11d. The other casing member 10 may also be provided with similar slots or openings. Air will be drawn by the fan 41 through one set of openings, forced through and around the motor and exhausted out the other set of openings or slots.

Although the casing members 10 and 11 are shown in the drawings as having two opposite sides flattened, it is, of course, obvious that this is not necessary to the invention as any shape casing may be used.

Having described my invention as related to the embodiment shown in the accompanying drawings, it is my intention that the invention be not limited by any of the details of description unless otherwise specified, but rather be construed broadly within its spirit and scope as set out in the accompanying claims.

I claim:

1. In a motor including an armature having a commutator, field laminations, field coils and brushes, a casing comprising a pair of members adapted to be held in abutting relationship, a bracket attached to one of said members on the inner surface thereof and spaced inwardly from the outer end of said one member, a flange cut from the other of said members and turned inwardly to leave a hole, a brush holder mounted on one portion of said bracket, and bolt means extending between another portion of said bracket and said flange to hold the casing members in said abutting relationship.

2. In a motor including an armature having a commutator, field laminations, field coils and brushes, a casing comprising a pair of members adapted to be held in abutting relationship, a bracket attached to one of said members on the inner surface thereof and having a pair of inwardly extending portions one of which is adjacent the commutator, a flange cut from the other of said members and turned inwardly to leave a hole, a brush holder mounted on said one bracket portion, and bolt means extending between said other bracket portion and said flange to hold the casing members in said abutting relationship.

3. The motor of claim 2 wherein said brush holder is rotably mounted on said one bracket portion, and means are provided for locking said holder on said portion.

4. In a motor including an armature having a commutator, field laminations, field coils and brushes, a casing comprising a pair of members adapted to be held in abutting relationship, a bracket attached to one of said members on the inner surface thereof and having a pair of inwardly extending portions one of which is adjacent the commutator, a flange cut from the other of said members and turned inwardly to leave a hole, a brush holder rotatably mounted on said one bracket portion, means for locking the brush holder on said one bracket portion, said holder having an open side normally closed by an insulating member held in place by said holding means, and bolt means extending between said other bracket portion and said flange with at least a portion of the field laminations being located between said other bracket portion and the flange whereby the bolt means serves to hold said portion of the field laminations and to hold the casing members in said abutting relationship.

5. In a motor including a casing, an armature and brushes, a bracket attached to the interior of the casing and having an inwardly-extending portion adjacent the armature, said bracket portion having a surface extending substantially transversely to the axis of said armature, a brush holder having a cavity in which the brush is held with said cavity having an open side, a removable insulating member normally closing said open side, and means pivotally mounting said brush holder on said surface of said inwardly-extending portion of said bracket.

6. In a motor including a casing, an armature and brushes, a bracket attached to the interior of the casing, a brush holder pivotally attached to said bracket, and means for locking said holder on said bracket, said brush holder being provided with an open side that is normally closed by an insulating member held in place by said locking means.

JOSEPH A. SCHWARZ.

REFERENCES CITED

The following references are of record in the file of this patent:

UNITED STATES PATENTS

| Number | Name | Date |
| --- | --- | --- |
| 805,499 | Stoycheff | Nov. 28, 1905 |
| 2,176,118 | Brinda | Oct. 17, 1939 |
| 2,300,957 | Miner | Nov. 3, 1942 |

FOREIGN PATENTS

| Number | Country | Date |
| --- | --- | --- |
| 500,417 | Great Britain | Feb. 8, 1939 |